United States Patent Office 2,871,267
Patented Jan. 27, 1959

2,871,267

β-CAROTENE DERIVATIVES AND METHOD OF PREPARING DERIVATIVES OF POLYENES

Francis J. Petracek and Laszlo K. Zechmeister, Pasadena, Calif., assignors to California Institute Research Foundation, Pasadena, Calif., a corporation of California No Drawing. Application June 28, 1956
Serial No. 594,343

13 Claims. (Cl. 260—586)

This invention relates to a method of preparing dehydrogenated and oxygenated derivatives of polyenes and particularly to a method of preparing such derivatives of polyenes having the β-ionylidene structure.

One of the principal objects of this invention is to provide a commercially practicable method by which dehydrogenated and oxygenated derivatives of polyenes may be prepared.

Another object of this invention is to provide a method by which dehydrogenated and oxygenated derivatives of polyenes may be prepared in a single reaction whereby intermediates need not be isolated.

Another object of this invention is to provide a commerically practicable method by which derivatives of carotenoid-hydrocarbons having varying spectral characteristics may be prepared.

Another object of this invention is to provide a method by which new derivatives of carotenoid-hydrocarbons may be prepared.

A further object of this invention is to provide a series of carotenoid-hydrocarbon derivatives having varying spectral characteristics.

A more specific object of this invention is to provide a series of β-carotene derivatives having varying spectral characteristics and a method for their preparation and isolation whereby such compounds may be used as coloring in food products and cosmetics.

Other objects and advantages of this invention, it is believed, will be readily apparent from the following detailed description of a preferred embodiment thereof.

Briefly, this invention comprises a method of preparing dehydrogenated and oxygenated derivatives of β-ionylidene type polyenes such as β-ionone and the carotenoid-hydrocarbons α-carotene, β-carotene and other provitamins A hydrocarbons in a single reaction. In accordance with this invention, means have been provided whereby the reaction may be carried out rapidly and economically, giving a high yield of desired reaction products which may be specifically isolated and purified.

Generally, these means include reacting the β-ionylidene polyene with a N-bromo compound such as N-bromosuccinimide (hereinafter, throughout this specification, to be abbreviated "NBS") in a chloroform-alcohol mixture to form bromo and ketal derivatives of the polyene, treating these intermediates with an organic base and separating the resulting derivatives by means of chromatography.

The use of NBS as a dehydrogenating agent for carotenoids was introduced in 1945 by Karer and Rutschmann (Helv. chim, Acta 28, 793). Henbest (J. Chem. Soc. (London), 1951, 1074), demonstrated that the β-ionylidene structure in a short polyene chain could be brominated by NBS followed by dehydrobromination of the intermediate with N-phenylmorpholine (hereinafter, throughout this specification to be abbreviated "NPM"). The reaction is illustrated by the following reaction scheme:

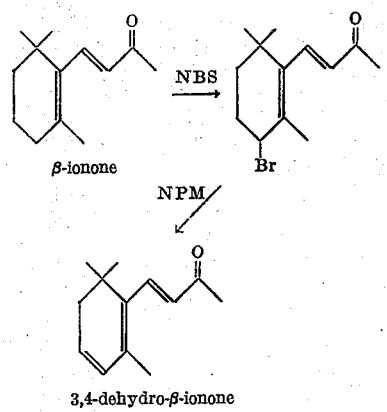

The reaction of β-carotene, having the structure,

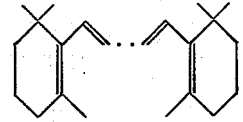

(The numbering system as shown by ( ) will be used and the β-carotene structure will be abbreviated as

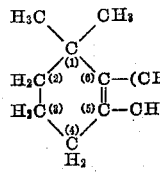

throughout the remainder of this specification) with NBS in the presence of carbon tetrachloride has been studied (L. Zechmeister and L. Wallcave, J. A. C. S. 75, 4493 (1953), and G. Karmakar and L. Zechmeister, J. A. C. S. 77, 55 (1955)), and it was found that when β-carotene is refluxed with carbon tetrachloride with NBS for several hours, a complex pigment mixture results. When this mixture is resolved by chromatography, it was found to yield five crystalline hydrocarbons which were characterized as:

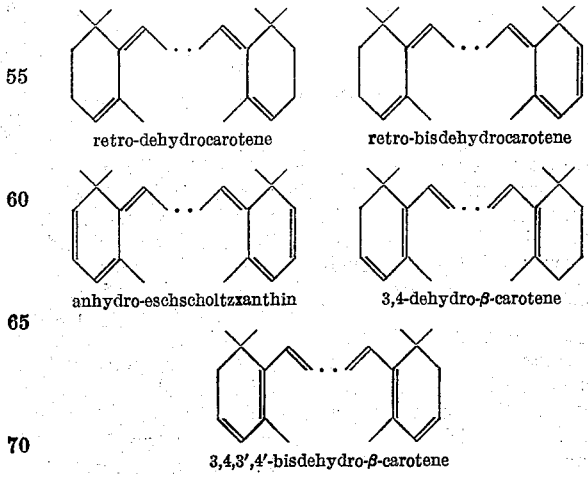

retro-dehydrocarotene   retro-bisdehydrocarotene anhydro-eschscholtzxanthin   3,4-dehydro-β-carotene 3,4,3',4'-bisdehydro-β-carotene It was determined that, in this reaction, the use of NPM did not increase the yield of the dehydrogenated products.

Examination of these compounds showed that the change in the unsaturated system caused a change in the color of the compound; thus, a conjugated ring double bond shifted the main maximum of the chomophore towards longer wave lengths. In addition, it has been determined that the presence of a carbonyl group in conjugation with the β-carotene chromophore also shifts the main maximum towards the longer wave lengths.

Since β-carotene has long been used as a food dye and its non-toxic character firmly established, efforts have been made to synthesize derivatives of β-carotene having varying spectral characteristics to extend the usefulness of this class of compound as food dyes and in cosmetics. Prior to this invention, no commercially practicable method of producing either the dehydrogenated or known oxygenated derivatives of β-carotene had been discovered.

We have determined that if β-carotene is reacted with NBS in chloroform containing alcohol, the resulting reaction products include both dehydrogenated and oxygenated derivatives. Further, we have discovered that the β-carotene is attacked at a much higher rate than when the reaction is carried out in carbon tetrachloride. The bromination phase of the reaction (manifested by a change in the color of the solution from deep red to dark brown) is complete in 30 seconds, even at —20° C. and the dehydrobromination in less than 10 minutes at the temperature of refluxing chloroform (61° C.). In addition, in contrast to the reaction in carbon tetrachloride, no β-carotene remains unchanged. Examination of the resulting reaction products shows that 60% of the original β-carotene is converted to a complex pigment mixture which, on resolution yielded the following five crystalline compounds:

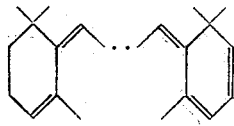
retro-bisdehdrocarotene

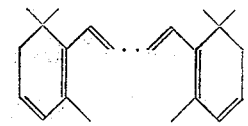
3,4,3',4'-bisdehydro-β-carotene

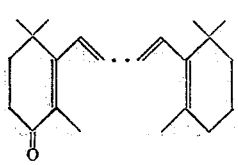
4-keto-β-carotene

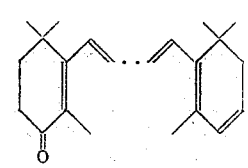
4-keto-3'-4'-dehydro-β-carotene

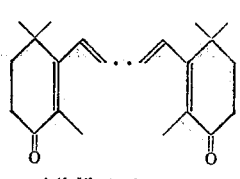
4,4'-diketo-β-carotene

Retro-bisdehydrocarotene and 3,4,3',4'-bis-dehydro-β-carotene were also found to be the reaction products of β-carotene and NBS in a carbon tetrachloride solution as has been noted above. The derivatives 4-keto-β-carotene and 4,4'-diketo-β-carotene have also been reported. However, 4-keto-3',4'-dehydro-β-carotene is a new compound and constitutes a part of the present invention.

The reaction is selective in that the keto oxygen always appears at the allylic or "4" position.

Further treatment of the oxygenated compounds, it has been discovered, also results in several new compounds. If the keto compounds are reacted with lithium aluminum hydride, the corresponding hydroxyl compounds are formed. If 4-keto-3',4'-dehydro-β-carotene is treated with a boron trifluoride-etherate solution, 4-keto-4'-hydroxy-β-carotene is formed. Of these hydroxyl compounds, which have been characterized as

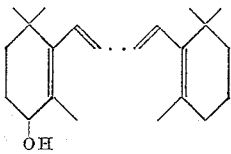
4-hydroxy-β-carotene

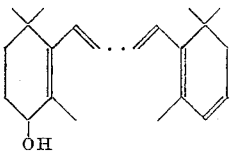
4-hydroxy-3',4'-dehydro-β-carotene

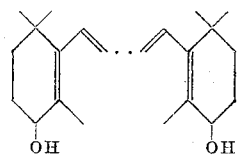
4,4'-dihydroxy-β-carotene

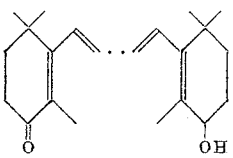
4-keto-4'-hydroxy-β-carotene 4-hydroxy-3',4'-dihydro-β-carotene, 4,4'-dihydroxy-β-carotene and 4-keto-4'-hydroxy-β-carotene are new compounds and also constitute a part of the present invention.

It has been determined that the presence of the hydroxyl group does not affect the spectral characteristics of the compound but does have a marked effect on its solubility. For example, the chromophores of 4-keto-β-carotene and 4-keto-4'-hydroxy-β-carotene have the same main maximum, but 4-keto-4'-hydroxy-β-carotene is more soluble in food products than the corresponding non-hydroxylated compound.

In addition to NBS, other N-bromo compounds of the N-bromoamide or N-bromoimide type may be used. For example, N-bromophthalimide and N-bromoacetamide may be substituted for NBS without changing the character of the reaction products.

Although ethanol was the alcohol used in the preparation of the oxygenated derivatives of β-carotene, it has been determined that it can be replaced by other alcohols such as methanol, propanol, butanol or benzyl alcohol.

It was also determined that the course of the reaction changes with the concentration of the alcohol. The best yields are obtained by using a molar ratio of alcohol to β-carotene of 20:1. When the concentration of alcohol is reduced, more of the retro-bis-dehydrocarotene is formed, while higher concentrations cause a decrease in the yield of all pigments formed.

The ratio of chloroform to β-carotene also affects the reaction. It has been discovered that the highest yields of the desired derivatives are obtained when the ratio of the chloroform-alcohol mixture to β-carotene is approximately 10 ml. of the mixture to 100 grams of β-carotene. Under these conditions, the amount of ethanol present, when that alcohol is used, is approximately 1% by volume.

The ratio of NBS to β-carotene may be varied depending on the relative proportions of the products desired. For example, when the ratio is 3:1, the principal oxygenated derivative is 4-keto-3',4'-dehydro-β-carotene, while if the ratio is 2:1, 4-keto-β-carotene is the principal oxygenated derivative.

The dehydrobromination phase of the reaction is carried out using NPM. However, any organic base of the substituted ammonia type may be used. This base may be characterized as

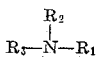

where $R_1$ may equal $R_2$ may equal $R_3$ and may be —H, —$CH_3$, —$C_2H_5$, —$C_6H_5$ or other aliphatic or aromatic hydrocarbon or oxygenated derivative.

The following specific examples will illustrate the process and method of forming the indicated dehydrogenated and oxygenated derivatives of β-carotene.

In all of the examples, certain standard techniques, equipment and reagents are used. A description of these is given which will apply throughout unless otherwise stated.

Adsorbents and solvents

The term lime-Celite refers to a 2:1 mixture of lime and Celite. The magnesia-lime-Celite was a 3:1:1 mixture of magnesia, lime and Celite. Calcium carbonate used was of reagent grade. Unless stated otherwise, the adsorbent used was lime-Celite and a 27 x 8 cm. column.

For chromatographic work, hexane (commercial grade), acetone (C. P., U. S. P.), benzene (reagent grade) and chloroform (reagent grade) were used. When mixtures of these solvents were used as the developers, the figures given in these cases (e. g. hexane+5% acetone) refer to volume percent of the second component in the mixture. Acetone was used for all elutions, unless stated otherwise; in some instances acetone-methanol mixtures were employed to elute more strongly adsorbed pigments. For crystallizations, only reagent grade solvents (except for hexane) were used.

Methods

Evaporations and concentrations were performed in vacuo (water aspirator) while a stream of pure dry nitrogen was bubbled through the solution. Sintered glass funnels were used for elutions, and where possible, all-glass apparatus was used for evaporations, washings, etc. Sodium sulfate was employed for the drying of the washed solutions. Washing was carried out in the Le Rosen automatic device.

Crystallizations, carried out exclusively by using two-solvent systems, are described by naming first, the solvent in which the compound was dissolved and second, the solvent used to effect crystallization; e. g. "from benzene-methanol" means that the compound was dissolved in the minimum amount of warm benzene and 4–5 volumes of methanol were added dropwise at approximately 40° C. Unless stated otherwise, samples for analysis were dried in an Abderhalden apparatus over phosphorous pentoxide at 50° C. and 1 mm. pressure. Crystalline forms were observed at 400×magnification. Melting points were taken in an electrically heated Berl block in evacuated capillaries and are corrected.

Molecular extinctions were calculated on the basis of two independent weighings.

The test for an allylic hydroxyl group (or the alkoxyl or acetyl derivative) was carried out as follows: To a few ml. of a dilute chloroform solution of the sample in an 18 x 135 mm. test tube (approximately 3 mg./liter) was added several drops of the HCl-chloroform reagent. A deepening of the color within several minutes, as compared with a blank, was considered a positive test and indicated the presence of an allylic-OH (or derivative). The color change is the result of the chromophore being lengthened by dehydration (in the case of an allylic OH).

Reagents

The N-bromosuccinimide (NBS) was of commercial grade and was used without further purification.

BF$_3$-etherate was prepared by passing the gas into ice-cooled ether (reagent grade). Upon distillation the fraction boiling from 122–125° C. was collected and stored in a dark brown bottle. Slightly discolored samples can be used without any decrease in the yields.

The HCl-chloroform reagent was prepared by saturating reagent grade chloroform with dry HCl gas for 10 minutes at room temperature.

Technical N-phenylmorpholine (NPM) was used.

Large scale preparation of β-carotene

For the preparation of large amounts of β-carotene required, the following procedure was worked out (α-carotene was also obtained). Eight grams of a commercial carotene preparation was dissolved in 200 ml. of warm benzene and the solution was diluted with hexane to 1.5 liters. This solution was adsorbed on a magnesia:lime:Celite filled conical percolator (45 x 22 x 8 cm.) and developed with 6 liters of benzene-hexane 1:2. (The figures of the left denote the width of zones, in mm.):

20 brown
20 pink:α-carotene
80 interzone
200 red-orange:β-carotene
30 interzone
100 yellow:α-carotene The β-carotene and α-carotene sections were separated by slicing them out from the top of the percolator. After elution with acetone and evaporation to dryness, the residues were crystallized from benzene-methanol or chloroform-methanol. Yield, 4 g. of β-carotene, M. P. 182–183° C. and 1.2 g. of α-carotene, M. P. 187–188° C.

Reaction of β-carotene with NBS in ethanol-containing chloroform

Generally, the reaction is carried out by adding 1 mole of β-carotene to a chloroform solution containing 20 moles of ethanol. There should be sufficient chloroform to readily dissolve the β-carotene but large excesses slow the reaction and decrease yields. As has been indicated, a ratio of 10 ml. of the chloroform-alcohol mixture to 100 mg. of β-carotene gives satisfactory results. To this solution is added 3 moles of NBS. The resulting reaction may be characterized as:

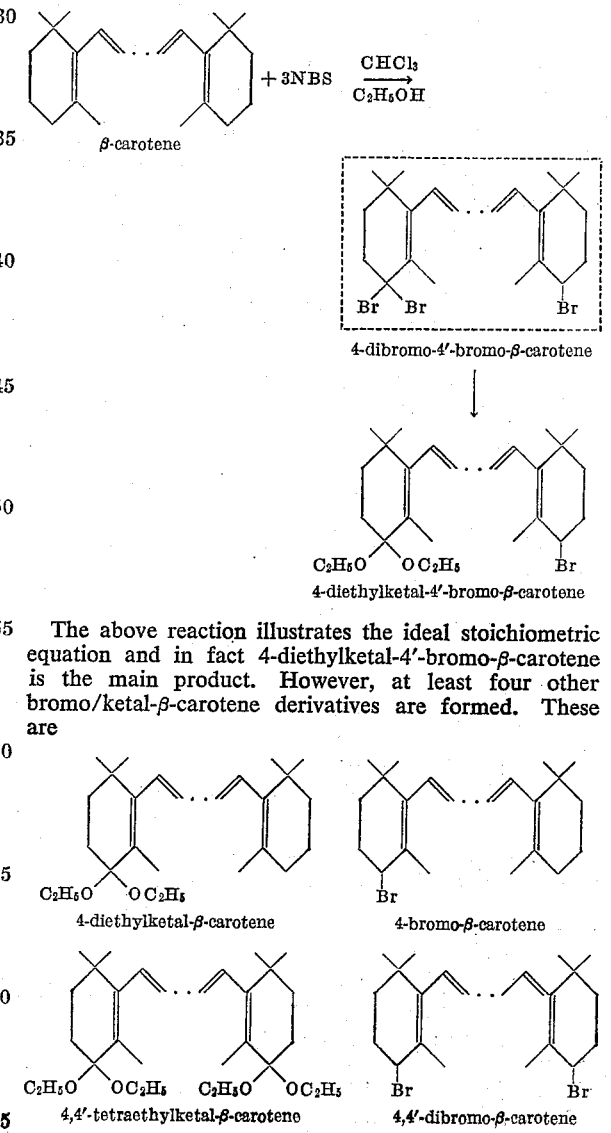

The above reaction illustrates the ideal stoichiometric equation and in fact 4-diethylketal-4'-bromo-β-carotene is the main product. However, at least four other bromo/ketal-β-carotene derivatives are formed. These are To the above solution is added an excess of NPM (i. e.—more than 3 moles of NPM for each mole of original β-carotene). The NPM acts as a dehydrobrominating agent and the reaction may be characterized as follows:

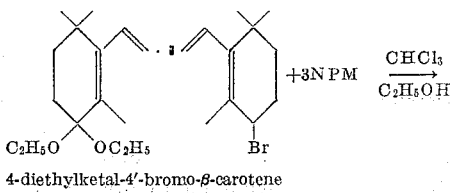

4-diethylketal-4'-bromo-β-carotene

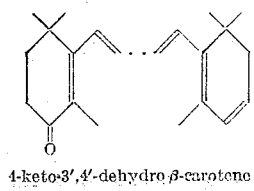

4-keto-3',4'-dehydro β-carotene

The other bromo/ketal β-carotenes react similarly to give 4-keto-β-carotene, 4,4'-diketo-β-carotene, 3,4,3',4'-bisdehydro-β-carotene and retro-bisdehydrocarotene.

That ethanol is not involved in the formation of the bromine substituted intermediates may be demonstrated by reacting β-carotene with NBS in pure (i. e.—alcohol-free) chloroform, observing the color change which indicates the formation of the brominated compounds, and then adding the ethanol. Further treatment with NPM gives the same products as those formed when ethanol is present from the begining of the reaction.

A specific example of the reaction and the technique of developing the principal reaction products is illustrated by the following:

To a solution of 100 mg. of β-carotene and 10 ml. of chloroform (reagent grade) containing about 1% ethanol by volume in a 50-ml. round-bottom flask was added rapidly, with stirring, a solution of 100 mg. of NBS in 10 ml. of the same grade of chloroform. Both solutions had been precooled to −18° C. in an ice-salt bath, and the temperature was held constant during the reaction. Vigorous stirring was accomplished by blowing a stream of nitrogen, through a perforated glass bulb, into the solution.

Immediately upon the addition of the NBS reagent, the deep red color of the solution changed to a dark brown. Half a minute later, 200 mg. of solid NPM was added and the stirring was continued for 2 more minutes. The flask was then removed from the cooling bath, and the solution refluxed on a steam bath for 15 minutes to effect dehydrobromination. Very soon after the start of refluxing the solution turned a deep red again (somewhat darker than that of the original mixture). The solution was cooled to room temperature, diluted with 40 ml. of hexane and shaken several times with 0.1 N hydrochloric acid to eliminate the NPM. The dark red, upper phase was then washed free of acid, dried, and evaporated completely. The oily residue was dissolved in 25 ml. of hexane and developed with hexane+5% acetone:

5 brown
10 red: 4,4'-diketo-β-carotene (zone A)
50 three diffuse pink zones: retro-bis-dehydrocarotenes (zone B)
30 deep red: all-trans-4-keto-3',4'-dehydro-β-carotene (zone C)
80 six pink-orange cis isomers of above compound and 4-keto-β-carotenes (zone D)
10 light orange: all-trans-3,4,3',4'-dehydro-β-carotene (zone E)
15 several yellow cis isomers of above compound (no β-carotene was detected)

*Development of 3,4,3',4'-bisdehydro-β-carotene*

The fraction corresponding to zone E was rechromatographed (developer, hexane+2% acetone):

150 empty section
15 pink-orange: all-trans-3,4,3',4'-bisdehydro-β-carotene
2 interzone
10 yellow-orange ⎫
3 interzone     ⎬ cis isomers of above
5 yellow        ⎭

By photometric estimation, the sum of the 3,4,3',4'-bisdehydro-β-carotenes amounted to 10 mg., i. e., 1% of the starting material. The trans fraction was eluted, evaporated and crystallized from benzene-methanol: Yield, 4 mg. (0.4%).

*Crystal form.*—Macroscopically, the crystals (from benzene-methanol) appeared much deeper red than β-carotene crystals of comparable size. Under the microscope, irregular plates were observed.

*Melting point.*—196–198° C.

*Partition behavior.*—100:0 in hexane: 95% methanol.

*Analysis.*—Calculated for $C_{40}H_{52}$: C, 90.16; H, 9.82. Found: C, 89.96; H, 9.94.

*Spectrum.*—λ max. at 471 mμ.

*Chromatographic behavior.*—When developed with hexane+2–3% acetone on lime-Celite, the bisdehydrocompound separated easily from β-carotene and occupies top position.

*Development of retro-bisdehydrocarotene*

The fraction corresponding to zone B was rechromatographed (developer, hexane+7% acetone):

20 minor pink zones
30 deep-pink: all-trans-retro-bisdehydrocarotene
25 pink-orange ⎫
20 orange      ⎬ cis isomers of former
15 yellow      ⎭
10 interzone
10 pink: 4-keto-3',4'-dehydro-β-carotene The 30-mm. zone was eluted, transferred to hexane and rechromatographed as described above on two columns. The single main zone of the all-trans compound was well separated from some minor cis isomers. After elution and evaporation to dryness, it was crystallized from benzene-methanol.

*Crystal forms.*—Long, quadrangular plates with jagged ends.

*Melting point.*—205–206° C.

*Partition behavior.*—100:0 in hexane: 95% methanol.

*Analysis.*—Calculated for $C_{40}H_{52}$: C, 90.16; H, 9.84. Found: C, 90.10; H, 10.03.

*Spectrum.*—The spectrum was identical with that reported by Zechmeister and Wallcave (J. A. C. S. 75, 4493 (1953)), for retro-bisdehydrocarotene (519, 487, 455 mμ).

The combined yield of the stereoisomeric retro-bisdehydrocarotenes, as estimated photometrically, was 5.5% (β-carotene=100%).

*Development of 4-keto-β-carotene*

The fraction corresponding to zone D was transferred to hexane and developed on three columns using hexane+4% acetone:

4 brown
40 interzone
50 pink: echinenone (4-keto-β-carotene)
2 interzone
50 red-orange       ⎫
45 two orange zones ⎬ cis-4-keto-3',4'-dehydro-β-carotenes
10 several minor zones ⎭
60 empty section The combined echinenone zones of the three columns were eluted, transferred to hexane and rechromatographed on a single magnesia-lime-Celite column using benzene-hexane (1:4)+15% acetone as the developer. The main, brick-red zone was eluted, evaporated to dryness and crystallized from benzene methanol. Yield, 12 mg.

*Crystal form.*—Rectangular plates, showing a dull red color when viewed macroscopically.

*Melting point.*—175–178° C.

*Partition behavior.*—93:7 in hexane: 95% methanol.

*Analysis.*—Calculated for $C_{40}H_{54}O$: C, 87.22; H, 9.88. Found: C, 87.41; H, 10.05.

*Spectrum.*—λ max. at 458 mµ.

*Chromatographic behavior.*—From hexane, echinenone is very strongly adsorbed on lime-Celite; however, when developed with hexane+5% acetone it separates easily from 4-keto-3',4'-dehydro-β-carotene, the latter occupying top position. Echinenone is adsorbed below isocryptoxanthin (4-hydroxy-β-carotene) and considerably above β-carotene on lime-Celite.

A sample of this synthetic echinenone was compared with naturally occurring echinenone isolated by Ganguly et al. (Arch. Biochem. Biophys. 60, 345 (1956)). The two samples were submitted to a mixed chromatogram test; no separation took place on lime-Celite (hexane+4% acetone).

If the β-carotene-NBS reaction is repeated changing the molar ratio of NBS to b-carotene from 3:1 to 2:1, the corresponding crystalline yield of 4-keto-β-carotene is 50 mg. of approximately four times as high.

*Development of 4-keto-3',4'-dehydro-β-carotene*

Zone C of the chromatogram was eluted with acetone; the pigment was transferred to hexane by the addition of water and developed with hexane+5% acetone. The main, bright-red zone was eluted and evaporated to dryness. The powdery residue was crystallized from benzene-methanol or from chloroform-methanol. Yield, 16 mg.

*Crystal form.*—The crystals obtained from benezene-methanol were quasi-elliptical. Under the microscope, they show red-purple color; macroscopically the shiny crystals appear almost black.

*Melting point.*—192–194° C.

*Solubility.*—Sparingly soluble in hexane; soluble in warm benzene; very easily soluble in chloroform; insoluble in methanol or ethanol.

*Partition behavior.*—92:8 in hexane: 95% methanol.

*Analysis.*—Calculated for $C_{40}H_{52}O$: C, 87.53; H, 9.55. Found: C, 87.44; H, 9.73.

*Spectrum.*—λ max. at 470 mµ.

*Chromatographic behavior.*—This pigment is strongly adsorbed on lime-Celite from hexane. It is adsorbed above echinenone and well separated from the latter upon developing with hexane+5% acetone.

*Development of 4,4'-diketo-β-carotene*

The section corresponding to zone A was rechromatographed on two columns (developer benzene-hexane, 3:1):

10 brown
5 minor pigment zones
30 deep red: all-trans-4,4'-diketo-β-carotene
10 orange: cis isomer of former
5 yellow: unidentified
40 three pale red, diffuse zones The 30-mm. zone was eluted, transferred to benzene-hexane and evaporated to dryness. The powdery, red residue was crystallized from chloroform-ethanol or from benzene-methanol. Yield, 12 mg.

*Crystal form.*—Trapezoidal prisms were obtained from benzene-methanol while long plates appeared from chloroform-ethanol.

*Melting point.*—213–214° C.

*Partition behavior.*—50:50 in hexane: 95% methanol.

*Analysis.*—Calculated for $C_{40}H_{52}O_2$: C, 85.05; H, 9.28. Found: C, 85.18; H, 9.31.

*Spectrum.*—The spectral curve showed maximum extinction at 466 mµ. No fine structure appeared. In ethanol, λ max. at 478 mµ; in benzene, at 480 mµ.

*Chromatographic behavior.*—This compound is adsorbed considerably above echinenone or retro-bis-dehydrocarotene but below zeaxanthin when developed with benzene on lime-Celite.

The use of lithium aluminum hydride as a reducing agent is well known. By the use of this compound, the keto group in 4-keto-β-carotene, 4-keto-3',4'-dehydro-β-carotene and 4,4'-diketo-β-carotene may be reduced to the corresponding hydroxyl compounds.

The following specific examples illustrate this process:

*Preparation of 4-hydroxy-3',4'-dehydro-β-carotene from 4-keto-3',4'-dehydro-β-carotene*

A solution of 50 mg. of 4-keto-3',4'-dehydro-β-carotene in 100 ml. of 1:9 mixture of anhydrous benzene and ether was slowly added, with stirring at room temperature, to a solution of 500 mg. of lithium aluminum hydride in 200 ml. of anhydrous ether. After standing for 15 minutes, the liquid was cooled to 0° C. and the excess hydride was decomposed by dropwise addition of methanol. The solution was then transferred to a separatory funnel where the gelatinous precipitate was removed from the organic phase by washing vigorously in the automatic device. (Attempts to filter the gel were unsuccessful.) The benzene-ether solution was dried and evaporated completely. The bright orange, powdery residue was dissolved in 50 ml. of benzene-hexane (1:4) and developed with hexane+7% acetone. A main pink-orange zone appeared (90 mm.); no cis forms were observed. The pigment of the main zone was crystallized from benzene-methanol or from chloroform-ethanol. Yield, 30 mg.

*Crystal form.*—Macroscopically the bright orange crystals from benzene-methanol have a brilliant metallic lustre. From methylene chloride-methanol rectangular plates are observed.

*Melting point.*—174–175° C.

*Solubility.*—Sparingly soluble in hexane, easily in cold chloroform or warm benzene; slightly soluble in methanol.

*Partition behavior.*—80:20 in hexane: 95% methanol.

*Analysis.*—Calculated for $C_{40}H_{54}O$: C, 87.22; H, 9.88. Found: C, 87.33; H, 9.95.

*Spectrum.*—λ max. at 461 mµ. The wave length position of λ max. and the shape of the curve were identical with those of 3,4-dehydro-β-carotene.

*Chromatographic behavior.*—On lime-Celite the hydroxy compound is adsorbed slightly above the parent ketone or isocryptoxanthin.

4-keto-β-carotene was treated in the same manner resulting in 4-hydroxy-β-carotene which had the same spectral characteristics as β-carotene.

*Preparation of 4,4'-dihydroxy-β-carotene from 4,4'-diketo-β-carotene*

To a solution of 50 mg. of the diketone in 100 ml. of benzene-ether (1:9) 100 mg. of lithium aluminum hydride in 100 ml. of anhydrous ether was added, with swirling. After standing for 15 minutes the excess hydride was decomposed at 0° C. by dropwise addition of methanol. The yellow solution was washed free of the gel, dried and evaporated completely. The bright orange, powdery residue was dissolved in 50 ml. of benzene-hexane (1:1) and developed on two columns with benzene+5% acetone. The mixture could also be resolved using hexane+30% chloroform. In either case, only one main, yellow zone of the trans diol appeared, which, after elution and evaporation, was crystallized from chloroform-hexane. The yield of this trans pigment was 90% (estimated photometrically).

*Crystal form.*—Macroscopically, the crystals apear red-orange, while under the microscope, yellow needles are observed.

*Melting point.*—142–145° C.

*Partition behavior.*—22:78 in hexane: 95% methanol.

*Analysis.*—Calculated for $C_{40}H_{56}O_2$: C, 84.44; H, 9.30. Found: C, 84.60; H, 9.43.

*Spectrum.*—The spectral curve was found to be identical with that of β-carotene.

*Chromatographic behavior.*—The diol is adsorbed above the parent diketone on lime-Celite or on lime-calcium carbonate-Celite when developed with benzene.

As has been indicated earlier, the keto-hydroxy compound, 4-keto-4'-hydroxy-β-carotene may be prepared by treating 4-keto-3',4'-dehydro-β-carotene with $BF_3$-etherate. It has previously been observed that boron trifluoride formed unstable deeply colored complexes with carotenoids. It has been shown that when boron trifluoride is reacted with retro-dehydrocarotene, the main product of the reaction is 4-hydroxy-β-carotene (L. Wallcave and L. Zechmeister, J. A. C. S. 75, 4495 (1953)).

As part of the present invention it has been discovered that when β-carotene is treated with $BF_3$-etherate in chloroform-alcohol solution (single phase), a dark blue complex forms within three minutes. Cleavage of the complex by means of an acetone-water mixture produced 4-hydroxy-β-carotene.

A specific example of this reaction is illustrated by the following:

To a deep red solution of 100 mg. of β-carotene in 100 ml. of chloroform (Merck's R. G. containing 1% ethanol of volume) 10 ml. of $BF_3$-etherate was added, with vigorous swirling. The solution turned green immediately, developing a deep blue color after 3 minutes, whereupon it was poured rapidly, with swirling, into a mixture of 1000 ml. of acetone and 200 ml. of water. Hexane (200 ml.) was added and the pale orange epiphase was washed for 30 minutes, dried and evaporated completely. The orange colored residue was dissolved in 5 ml. of benzene, diluted to 50 ml. with hexane, and developed with hexane:

70 red-orange: 4-hydroxy-β-carotenes
100 interzone
30 three orange zones (450, 479 mμ)
20 interzone
10 orange (434, 458, 488 mμ)
3 interzone
10 pale yellow
30 empty section The 70-mm. red-orange zone was rechromatographed on lime-Celite with hexane+5% acetone as the developer:

40 empty section
50 orange: all-trans-isocryptoxanthin
30 deep yellow: cis-isocryptoxanthins
45 interzone
20 two minor diffuse yellow zones
70 empty section The yield of the all-trans-isocryptoxanthin (determined photometrically) was 32%. After evaporation of the hexane solution, the powdery, orange residue was crystallized from chloroform-ethanol. Yield, 18 mg. (18%).

*Crystal form.*—Oval plates.

*Melting point.*—166–168° C.

*Partition behavior.*—86:14 in hexane: 95% methanol.

*Analysis.*—Calculated for $C_{40}H_{56}O$: C, 86.87; H, 10.22. Found: C, 87.08; H, 10.44.

*Spectrum.*—The spectrum was identical with that reported earlier for isocryptoxanthin (and β-carotene).

A mixed chromatogram with an authentic sample of isocryptoxanthin showed no separation (lime-Celite; hexane+4% acetone).

It has similarly been determined that 4-hydroxy-B-carotene may be produced by treating either retro-dehydrocarotene or 3,4-dehydro-β-carotene with boron trifluoride complex in chloroform. Examples of these reactions are given as follows:

*4-hydroxy-β-carotene from retro-dehydrocarotene via the $BF_3$ complex in chloroform*

The reaction was carried out with 100 mg. of all-trans-retro-dehydrocarotene as described for β-carotene but the time allowed for the complex formation was shortened to 15 seconds and the temperature of both the chloroform and the acetone-water was maintained at 0° C. during hydrolysis.

The pigment mixture was developed on a column with hexane+6% acetone:

30 four pink and orange zones
45 interzone
20 yellow
5 interzone
35 orange: all-trans-4-hydroxy-β-carotene
4 interzone
15 orange ⎫
12 interzone ⎬ cis-4-hydroxy-β-carotenes
6 yellow ⎭
45 empty section The trans-4-hydroxy-β-carotene zone was eluted, transferred to hexane, washed and dried. Yield, 13 mg. The substance crystallized as oval plates from chloroform-methanol. Yield, 7 mg. The preparation was identified with isocryptoxanthin by the partition behavior, melting point, spectrum and mixed chromatogram.

*4-hydroxy-β-carotene from 3,4-dehydro-β-carotene via the $BF_3$ complex in chloroform.*

The complex formation and hydrolysis were carried out with 20 mg. of substance as described for β-carotene but the time for the complex formation was reduced to 1 minute. After chromatography, the all-transisocryptoxanthin (2.5 mg., photometrically estimated) was crystalized from chloroform-methanol.

*Crystal form.*—Oval plates.

*Melting point.*—165–168° C.

*Partition behavior.*—86:14 in hexane: 95% methanol.

*Spectrum.*—The spectral curve was identical with that of isocryptoxanthin.

*Reaction with the HCl-chloroform reagent.*—The test for allylic hydroxyl was positive.

A mixed chromatogram test with an authentic sample of isocryptoxanthin showed no separation (lime-Celite, hexane+5% acetone).

Finally, it has been discovered that by treating 4-keto-3',4'-dehydro-β-carotene with the boron trifluoride complex a new compound 4-keto-4'-hydroxy-β-carotene may be prepared. This compound has the same spectral characteristics as 4-keto-β-carotene but is more soluble in food products. A specific example of the formation of 4-keto-4'-hydroxy from 4-keto-3',4'-dehydro-β-carotene is given as follows:

To 33 mg. of 4-keto-3',4'-dehydro-β-carotene in 33 ml. of ethanol-free chloroform was added rapidly, with vigorous stirring, 3.3 ml. of $BF_3$-etherate. Having shown intermediate blue and green colors, the solution turned dark purple within 2 minutes. It was rapidly poured, while stirring, into 400 ml. of a water-acetone (1:4) mixture. The purple complex was destroyed immediately and the solution became red-orange, rather similar in color to the starting material. Sixty milliliters of hexane was then added, the upper phase was separated, washed thoroughly in the automatic apparatus for 30 minutes, and dried. After evaporation, the dark red, oily residue was dissolved in 25 ml. of benzene-hexane (1:3) and developed with pure benzene:

10 reddish-brown
25 interzone
30 pink: all-trans-4-keto-4'-hydroxy-β-carotene
10 orange-pink: unidentified
60 interzone
10 light purple: probably unreacted starting material
125 empty section The 30-mm. fraction was transferred to benzene, washed, dried and evaporated. The dark red, powdery residue was crystallized from chloroform-hexane. Yield, 6 mg.

*Crystal form.*—Diamond-shaped plates, from chloroform-hexane.

*Melting point.*—164–167° C.

*Partition behavior.*—34–66 in hexane: 95% methanol.

*Analysis.*—Calculated for $C_{40}H_{54}O_2$: C, 84.75; H, 9.60 Found: C, 84.41; H, 9.72.

*Spectrum.*—The spectrum taken in the visible and ultra-violet regions was identical with that of 4-keto-β-carotene, λ max. at 458 mμ.

*Chromatographic behavior.*—This pigment is adsorbed below 4,4′-dihydroxy-β-carotene and above 4,4′-diketo-β-carotene when developed with benzene on lime-Celite.

The following table summarizes the variations in the position of the main maximum of the chromophore of the indicated compounds:

| Compound: | Maximum, mμ |
|---|---|
| β-Carotene | 451 |
| 4-hydroxy-β-carotene | 451 |
| 4,4′-dihydroxy-β-carotene | 451 |
| 4-keto-β-carotene | 458 |
| 4-keto-4′-hydroxy-β-carotene[1] | 458 |
| 4-hydroxy-3′,4′-dehydro-β-carotene[1] | 460 |
| 4,4′-diketo-β-carotene | 466 |
| 4-keto-3′,4′-dehydro-β-carotene[1] | 468 |
| 3,4,3′,4′-bisdehydro-β-carotene | 471 |
| Retro-bisdehydrocarotene | 487 |

[1] New compounds forming a part of this invention.

Each of the above listed compounds may be produced by the processes previously indicated and is usable as a food or cosmetic dye either individually or in combination. It may be seen that the reaction products of β-carotene NBS–NPM reaction can be used as a dye without separating the individual products. The relative proportions of the reaction products remain constant giving the pigment mixture a different and reproducible color. Whether used individually or collectively, these derivaties may be used to dye foods or cosmetics over a color range from yellow to purple.

The reaction of β-carotene with NBS in chloroform containing ethanol was repeated in order to determine the effect of various concentrations of ethanol, the effect of other alcohols, the effect of other substituted ammonia organic bases and the effect of other N-bromo compounds.

It has been determined that 1% ethanol (molar ratio, ethanol:β-carotene 20:1) is optimum for the reaction.

The following table illustrates the effect of varying the ethanol content in the chloroform in the formation of 4-keto-3′,4′-dehydro-β-carotene:

| Ethanol (percent by volume) in chloroform (the first five figures refer to artificial mixtures and the last one to commercial chloroform). | Percent β-Carotene converted into all-trans-4-keto-3′,4′-dehydro-β-carotene |
|---|---|
| 0.1 | 7 |
| 0.7 | 20 |
| 1.0 | 25 |
| 1.4 | 16 |
| 10.0 | 5 |
| 1 | 25 |

When the β-carotene-NBS reaction was repeated using other alcohols in the same molar ratio (i. e., 20:1), the result was essentially the same as obtained with chloroform and 1% ethanol, i. e., about 25% of the 4-keto-3′,4′-dehydro-β-carotene was formed.

In terms of percentages, if either 0.7% methanol, 1.3% propanol, 1.6% butanol or 2% benzyl alcohol is used in ethanol-free chloroform, similar results are obtained.

Other aliphatic or aromatic bases of the substituted ammonia type may be used with no change in the reaction products. For example, both aniline and diethyl amine have been used and are qualitatively effective in the reaction, giving the same reaction products. Since aniline is a weaker base than NPM and diethyl amine stronger, it is apparent that a wide range of base strengths may be used effectively.

N-bromophthalimide or N-bromoacetamide may be used without change in the reaction products. It will be apparent that all N-bromoamides and imides would be equally satisfactory.

*Reaction of α-carotene with NBS in ethanol-containing chloroform*

α-Carotene was treated by NBS in chloroform containing 1% alcohol. Because of the variation in the bond structure between β-carotene and α-carotene, substitution of the allylic keto group could only be made at the 4 position. The following reaction shows the formation of 4-keto-α-carotene. It will be noted that the molar ratio of α-carotene to NBS is 1:2.

α-Carotene (100 mg.) was treated with 66 mg. of NBS (molar ratio, 1:2) in ethanol-containing chloroform as described for β-carotene. The reaction mixture was developed with hexane+3% acetone:

4 brown
30 interzone
10 pink
4 interzone
5 orange
5 interzone
50 pink-orange: all-trans-4-keto-α-carotene
70 four diffuse orange zones: probably cis isomers of the former
15 interzone
5 orange: unreacted α-carotene The photometrically estimated yield of the stereoisomeric 4-keto-α-carotenes was 20 mg. (corresponding to 20% of the starting material), and the yield of the all-trans form after crystallization from benzene-methanol amounted to 12 mg.

*Crystal form.*—Broad, orange-red slightly oval plates. Macroscopically, the crystals are much deeper in color than those of α-carotene.

*Melting point.*—188–189° C.

*Partition behavior.*—95:5 in hexane: 95% methanol.

*Analysis.*—Calculated for $C_{40}H_{54}O$: C, 87.22; H, 9.88. Found: C, 87.12; H, 9.93.

*Spectrum.*—The curve showed but little fine structure; λ max. at 451 mμ.

The above reaction may be characterized as

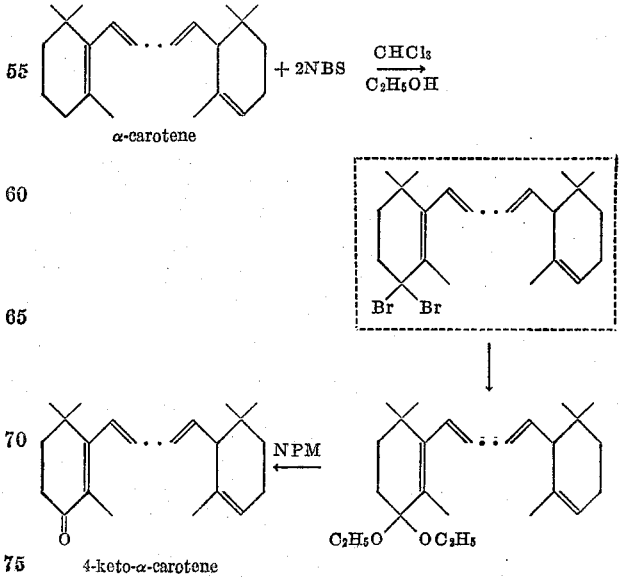

It may be seen that other compounds having the β-ionylidene structure may be similarly treated to produce oxygenated derivatives. 4-keto-β-ionone, for example, may be derived by reacting β-ionone with NBS and NPM in the chloroform-alcohol mixture.

Having fully described our invention, it is to be understood that we do not wish to be limited to the precise details of the examples set forth but our invention is of the full scope of the appended claims.

We claim:

1. A process for preparing derivatives of compounds having a β-ionylidene structure comprising: reacting one of said compounds with a N-bromo compound selected from the class consisting of N-bromoamides and N-bromoimides in the presence of chloroform and alcohol.

2. A process for preparing derivatives of compounds having a β-ionylidene structure, the steps comprising: reacting one of said compounds with N-bromosuccinimide in a chloroform-alcohol mixture to form bromo and ketal intermediates; and reacting said intermediates with an organic base of the substituted ammonia type.

3. A process for preparing derivatives of carotenoid hydrocarbon, the steps comprising: reacting one of said compounds with N-bromosuccinimide in a chloroform-alcohol mixture to form bromo and ketal intermediates; reacting said intermediates with an organic base of the substituted ammonia type; and separating the resulting compounds by chromatography.

4. A process for preparing derivatives of β-carotene, the steps comprising: reacting said compound with a N-bromo compound selected from the class consisting of N-bromoamides and N-bromoimides in a chloroform-alcohol mixture to form bromo and ketal intermediates, reacting said intermediates with an organic base of the substituted ammonia type and separating the resulting compounds by chromatography.

5. A process for preparing ketal derivatives of β-carotene, the steps comprising: reacting said compound with N-bromosuccinimide in a mixture of chloroform and alcohol, the molar ratio of said compound to said alcohol being 1:20.

6. A process for preparing oxygenated and dehydrogenated derivatives of β-carotene, the steps comprising: reacting said compound with N-bromosuccinimide in a mixture of chloroform and alcohol to form bromo and ketal intermediates; the molar ratio of said compound to said alcohol being 1:20; reacting said intermediates with an organic base of the substituted ammonia type; the molar ratio of said base to original β-carotene being in excess of 3:1 and isolating and purifying the resulting reaction products by chromatography.

7. A process for preparing oxygenated and dehydrogenated derivatives of β-carotene, the steps comprising: reacting said compound with N-bromosuccinimide in a mixture of chloroform and alcohol to form bromo and ketal intermediates; the molar ratio of said compound to said alcohol being 1:20; reacting said intermediates with N - phenylmorpholine; the molar ratio of said N - phenyl - morpholine to original β - carotene being in excess of 3:1 and isolating and purifying the resulting reaction products by chromatography.

8. A process for preparing oxygenated derivatives of β-carotene, the steps comprising: reacting said compound with N-bromosuccinimide in a chloroform-alcohol mixture to form bromo and ketal intermediates; reacting said intermediates with an organic base of the substituted ammonia type; isolating and purifying the resulting keto derivatives by chromatography and reducing said keto derivatives with lithium aluminum hydride to form hydroxyl derivatives.

9. A process for preparing 4-keto-4'-hydroxy-β-carotene, the steps comprising: reacting β-carotene with N-bromosuccinimide in a chloroform-alcohol mixture to form bromo and ketal intermediates; reacting said intermediates with an organic base of the substituted ammonia type; isolating and purifying 4-keto-3',4'-dehydro-β-carotene from the resulting reaction products by chromatography; reacting said isolated and purified compound with a boron trifluoride-etherate solution in chloroform; combining the reaction mixture with a water-acetone mixture and isolating the resulting 4-keto-4'-hydroxy-β-carotene.

10. A derivative of β-carotene selected from the class consisting of: 4-keto-3',4'-dehydro-β-carotene; 4-hydroxy-3'-4'-dehydro-β-carotene; and 4-keto-4'-hydroxy-β-carotene.

11. 4-keto-3',4'-dehydro-β-carotene.

12. 4-hydroxy-3',4'-dehydro-β-carotene.

13. 4-keto-4'-hydroxy-β-carotene.

References Cited in the file of this patent

Karrer et al.: Carotenoids, page 183 (1950).
Henbest: J. Chem. Soc. (London), 1951, 1074.
Karrer et al.: Helv. Chim. Acta 34, 445–53 (1951).
Wallcave et al.: J. A. C. S. 75, 4495 (1953).
Gaylord: "Reduction With Complex Metal Hydrides," pp. 148–59, Interscience Publishers, Inc., New York, N. Y., 1956.